United States Patent [19]

Berger et al.

[11] 3,902,737

[45] Sept. 2, 1975

[54] CHILD CARRIER AND MOUNTING ASSEMBLY FOR BICYCLE

[75] Inventors: Irvin E. Berger, Skokie; Kenneth F. Welter, Addison, both of Ill.

[73] Assignee: Sears, Roebuck and Co., Chicago, Ill.

[22] Filed: Feb. 4, 1974

[21] Appl. No.: 439,073

[52] U.S. Cl. ............................... 280/202; 297/423
[51] Int. Cl.² ............................................. B62J 1/28
[58] Field of Search .. 280/202; 297/DIG. 2, DIG. 9, 297/195, 243, 423; 224/30, 31, 32

[56] References Cited
UNITED STATES PATENTS

| 409,964 | 8/1889 | Harvey | 280/202 X |
|---|---|---|---|
| 416,699 | 12/1889 | Whitman | 297/423 |
| 453,212 | 6/1891 | Sager | 280/202 |
| 479,845 | 8/1892 | Sager | 280/202 |
| 740,905 | 10/1903 | Otterbein | 280/202 X |
| 3,802,598 | 4/1974 | Burger | 280/202 |

FOREIGN PATENTS OR APPLICATIONS

| 115,437 | 5/1948 | Netherlands | 280/202 |
|---|---|---|---|
| 7,300 | 2/1892 | United Kingdom | 280/202 |
| 678,044 | 8/1952 | United Kingdom | 280/202 |
| 25,511 | 9/1904 | United Kingdom | 280/202 |
| 28,592 | 4/1914 | United Kingdom | 280/202 |

Primary Examiner—David Schonberg
Assistant Examiner—Terrance L. Siemens
Attorney, Agent, or Firm—Arnstein, Gluck, Weitzenfeld & Minow

[57] ABSTRACT

A carrier and mounting assembly for carrying a child on the front end of a bicycle. The carrier is attached to the headpost of the bicycle frame so that it does not turn with the handlebars. The assembly is readily separable so that the seat portion may be quickly detached from the bicycle when not needed.

3 Claims, 10 Drawing Figures

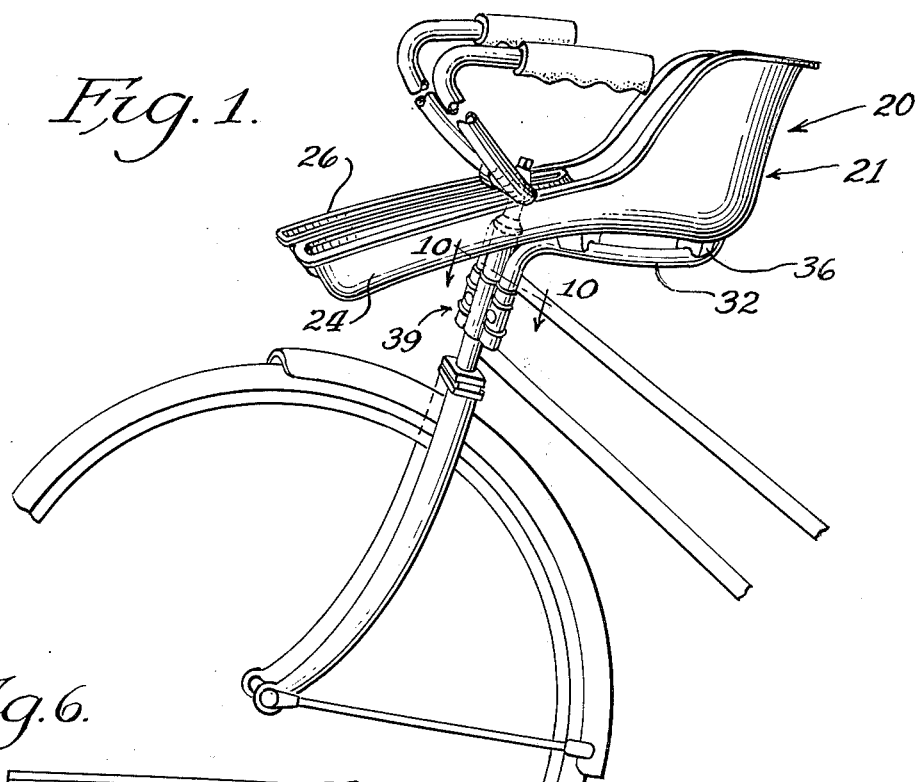
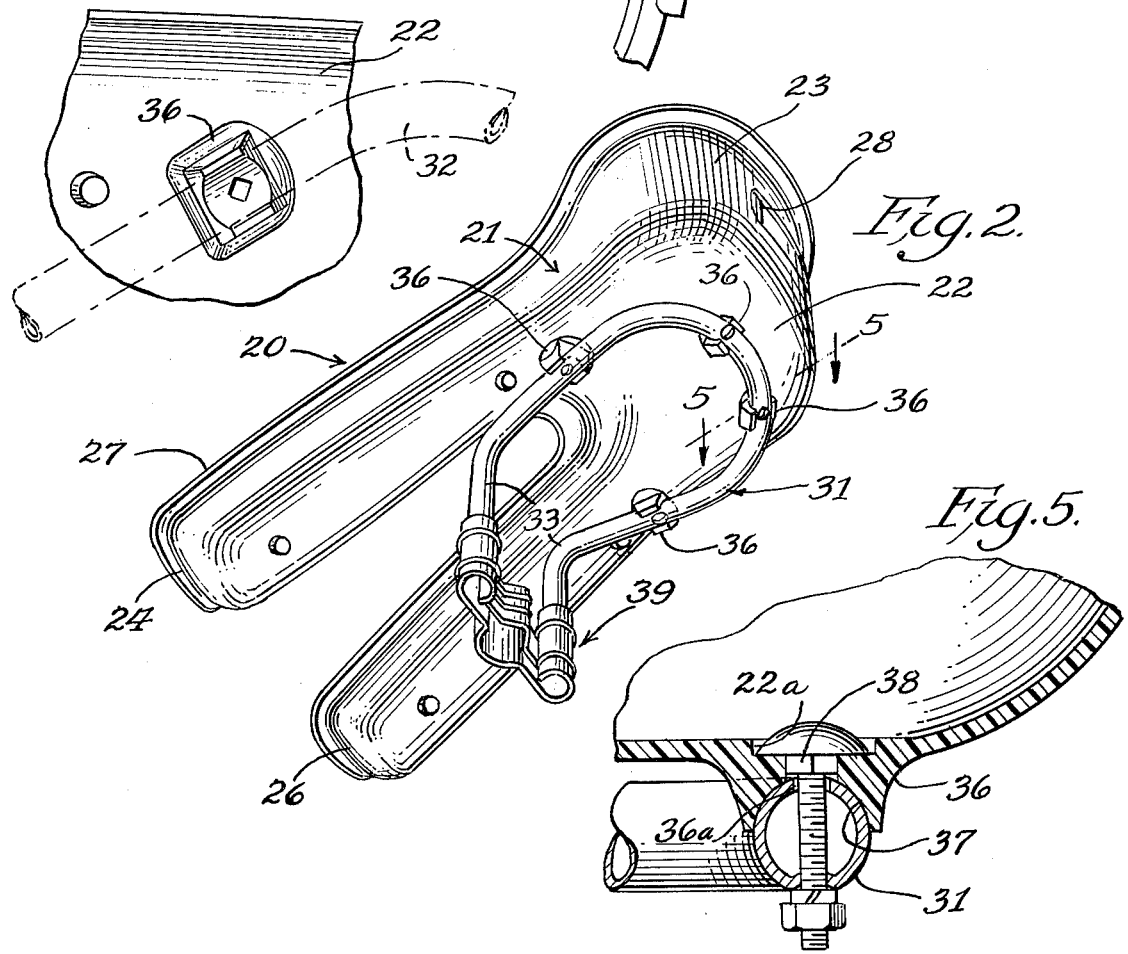

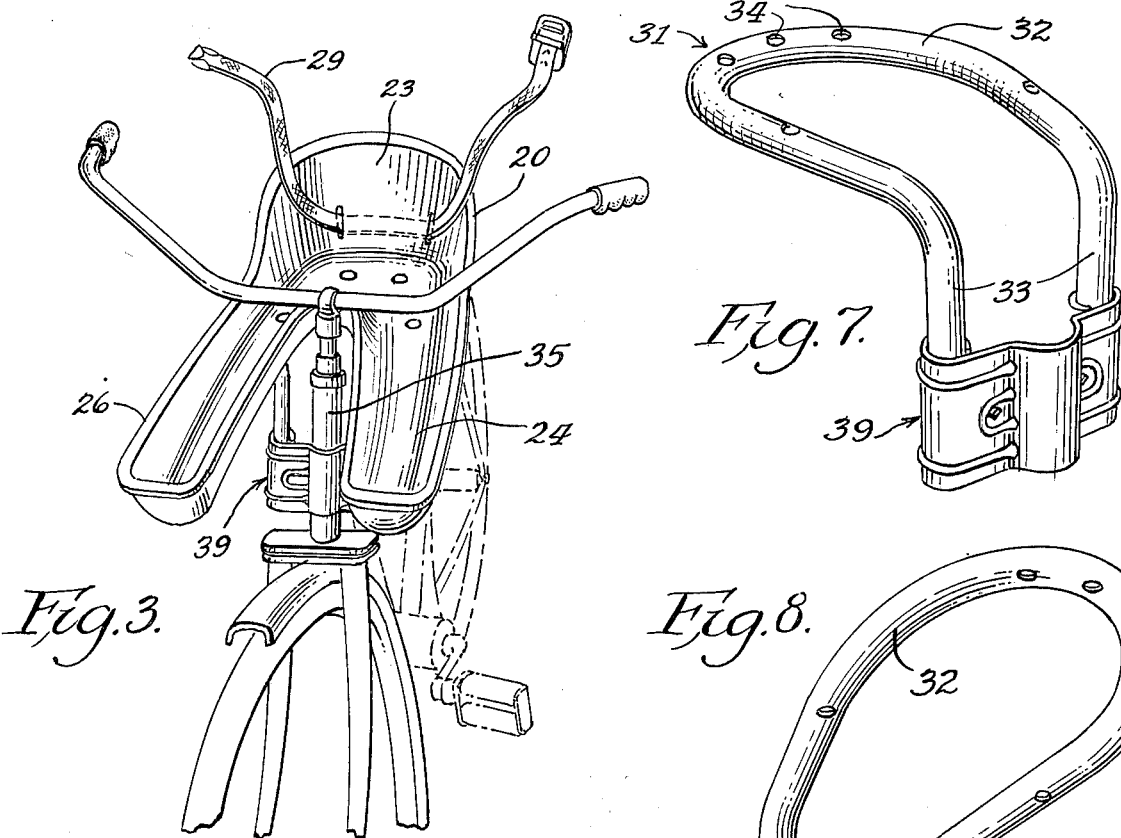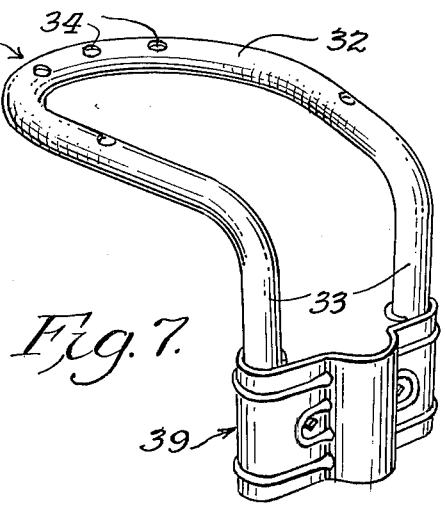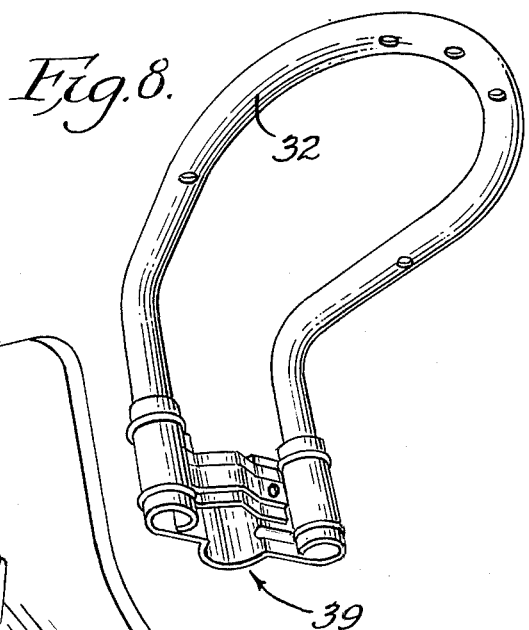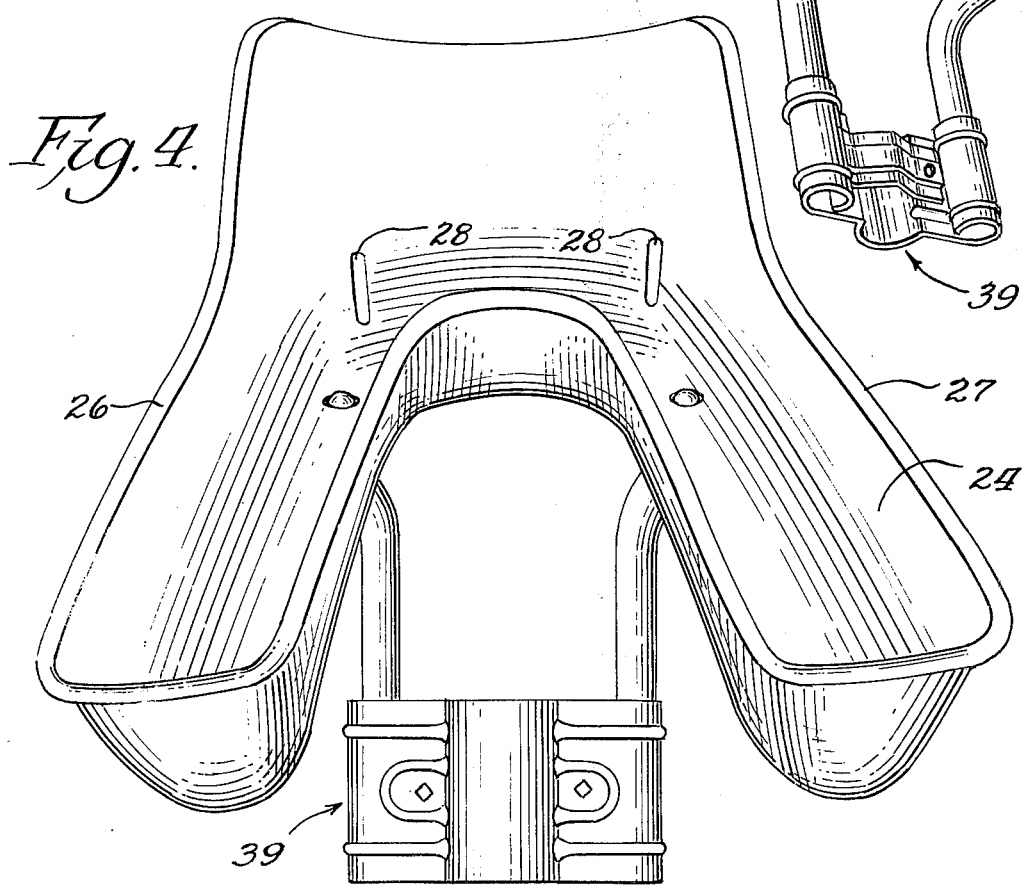

CHILD CARRIER AND MOUNTING ASSEMBLY FOR BICYCLE

BACKGROUND OF THE INVENTION

The present invention relates to a carrier and mounting assembly for carrying a child on the front portion of a bicycle.

Carriers for carrying a child as a passenger on the front portion of a bicycle are known. However, these carriers generally are attached to the handlebars of the bicycle so that they turn with the handlebars. When a child is in the carrier, a greater physical effort is required on the part of the rider to steer the bicycle, since the rider is required to move the child's weight. Further, constant changing of the child's position in the course of steering the bicycle has the effect of constantly changing the equilibrium of the riders in relation to the bicycle which could result in loss of control and possible injury to the riders. Further, such carriers generally were permanently attached to the handlebars so that the carrier always remained as a part of the bicycle even when no child occupied the carrier.

BRIEF SUMMARY OF THE INVENTION

One of the objects of this invention is the provision of a front mounted carrier for carrying a child on a bicycle always in view of the rider.

Another object of this invention is the provision of a carrier of the foregoing type which is mounted on the headpost of the bicycle frame so that the carrier is not turned with the handlebars in the course of steering the bicycle thereby avoiding unbalancing of the bicycle and changes in equilibrium during operation of the bicycle.

Still another object of this invention is the provision of a mounting means for a child carrier in which the carrier is separable to permit ready detachment of the carrier from the bicycle.

BRIEF DESCRIPTION OF THE DRAWINGS

FIG. 1 is a side perspective view of the front portion of a bicycle and showing our invention mounted thereon.

FIG. 2 is a bottom perspective view of the carrier and mounting assembly.

FIG. 3 is a front perspective view of the carrier mounted on the front portion of a bicycle.

FIG. 4 is a front perspective view, on an enlarged scale, showing the carrier and mounting assembly of our invention, removed from a bicycle.

FIG. 5 is a fragmentary cross-sectional view, on an enlarged scale, taken substantially on line 5—5 of FIG. 2.

FIG. 6 is a fragmentary perspective view on an enlarged scale, of a structural detail.

FIG. 7 is a front perspective view of the mounting means in accordance with our invention.

FIG. 8 is a rear perspective view of the mounting means shown in FIG. 7.

BRIEF DESCRIPTION OF A PREFERRED EMBODIMENT

Figure 9:
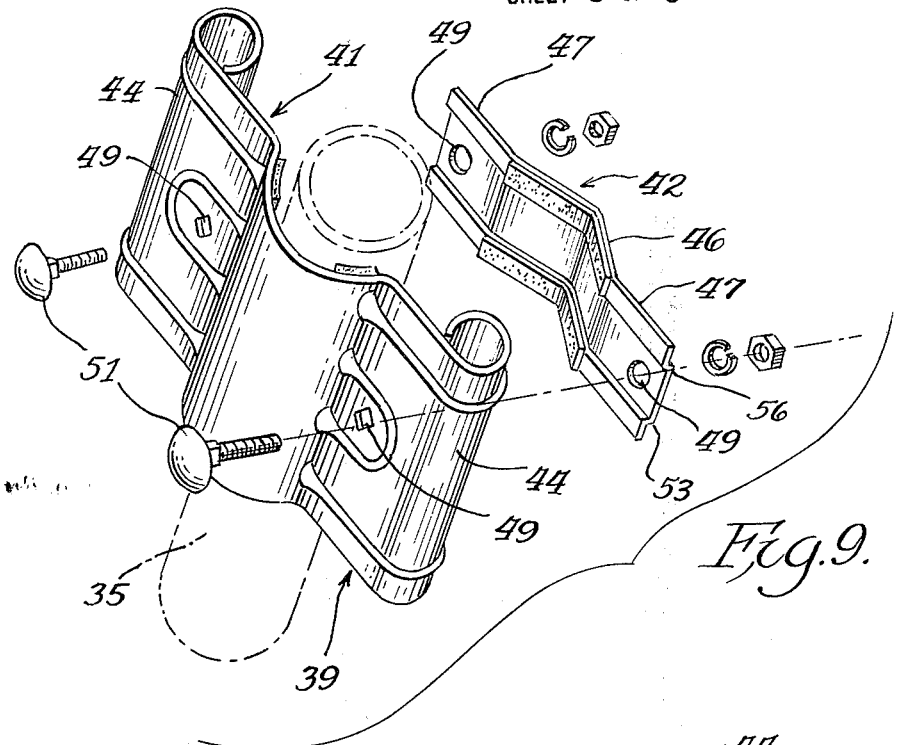
FIG. 9 is an exploded perspective view, on an enlarged scale, of a mounting component of the assembly.
Figure 10:
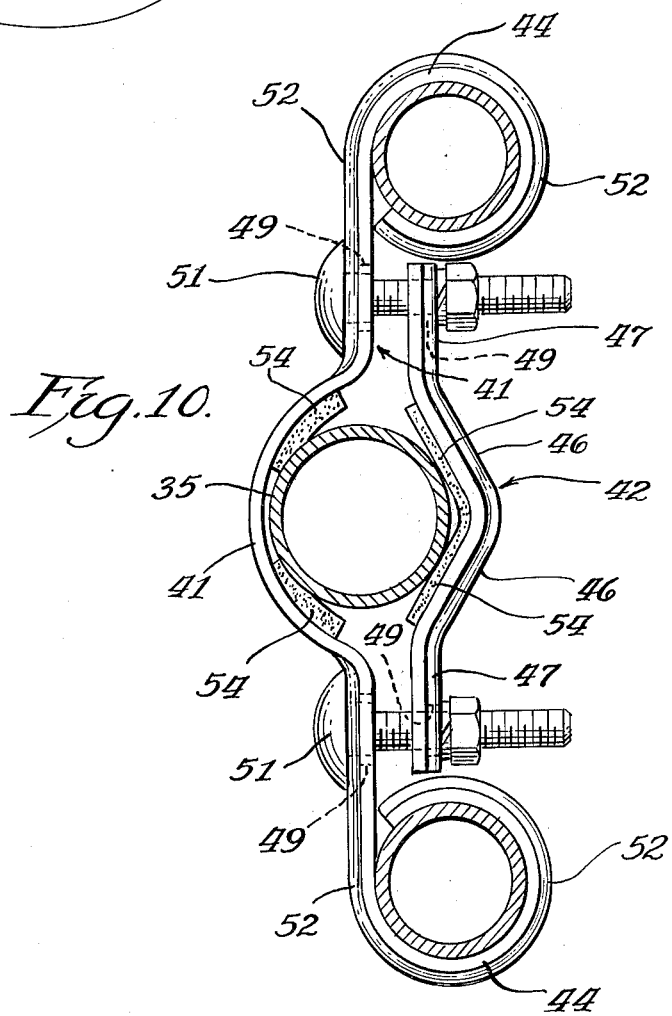
FIG. 10 is a cross-sectional view, on an enlarged scale, taken substantially on line 11—11 of FIG. 1.

The front carrier 20 of the present invention includes a one-piece molded seat member 21 preferably formed of high impact-resistant resinous material, such as high impact polyethylene. The seat member 21 is shaped substantially as illustrated in the drawings and includes a body portion constituting a seat bottom 22 and a generally U-shaped integral back support 23 extending upwardly from three sides of the seat bottom so as partially to enclose the lower torso portion of a seated child on three sides. The seat member 21 includes a pair of forwardly extending integral downwardly inclined leg portions 24 and 26 for partially enclosing the legs and feet of a seated child. As will be apparent, the leg portions 24 and 26 have side and end walls which are of sufficient height to inhibit the movement of the legs of the child and prevent contact of the legs with the front wheel of the bicycle. The seat member 21 is formed with an outwardly formed rim 27 extending along its entire outer edge portion and affording increased rigidity to the structure. The back support 23 is provided with a pair of spaced slits 28 through which is passed a flexible belt 29 provided with a suitable buckle for encircling and securing the body of the child sitting in the seat member.

The seat member 21 is mounted on a tubular frame 31 illustrated more clearly in FIGS. 7 and 8. The frame includes a generally U-shaped portion 32 having downwardly turned leg portions 33. Preferably, the angular relationship between the plane of the U-shaped portion 32 and that of the legs 33 is slightly greater than 90 degrees so as to compensate for the slightly angular deviation of the headpost 35 of the bicycle from a true vertical axis. This is a common structural characteristic of most bicycles. As a result, when the frame 31 is attached to the bicycle, as will be hereinafter explained, the U-shaped portion 32 is disposed in a generally horizontal plane. The frame member 31 is provided with four holes 34 through which are passed suitable bolts for securing the frame to the carrier.

Referring to FIGS. 2 and 5, the underside of the seat member 21 is provided with four integral bosses 36 shaped substantially in cross-section as illustrated in FIG. 5 and located to register with respective holes 34 in the frame 31. Each of the bosses 36 has an arcuate recess 37 opening downwardly and arranged to snugly engage a corresponding portion of the frame 31, as illustrated in FIG. 5. Each of the bosses 36 is perforated and the surface of the seat bottom 22 concentric with each perforation 36a is recessed as at 22a, as shown in FIG. 5. The perforations 36a are arranged to register with the holes 34 in the frame 31 and to receive carriage bolts 38 which secure the seat member 21 to the frame.

A clamp 39 shaped substantially as illustrated in FIG. 9 comprises a pair of cooperating members 41 and 42. The member 41 preferably is formed of suitable sheet metal and includes an intermediate arcuate portion 43 and integral side wings 44, the terminal portions of which are circularly bent to form cylindrical seats for frictionally receiving the legs 33 of the frame 31. A cooperating clamp member 42 includes a generally V-shaped intermediate portion 46 and integral co-planar side wings 47. The clamp members 41 and 42 are provided with suitable registering apertures 49 through which carriage bolts 51 are passed for securing the clamp 39 to the headpost 35 of a bicycle. Each of the members 41 and 42 is suitably embossed with ribs 52 or offset portions 53 which serve to improve the rigidity of the members. Preferably, strips 54 of rubber, felt or other suitable material are interposed between the headpost 35 and the clamp 39 to prevent marring the finish of the headpost.

In use, the clamp 39 is attached to the headpost 35 of the bicycle and remains more or less as a permanent part of the bicycle. The seat member 21 may be removably attached to the clamp 39 by inserting the legs 33 into the cylindrical sockets 44 of the clamp. In assembled relation, the legs 24 and 26 of the carrier straddle the headpost 35 of the bicycle and do not in any way interfere with the steering of the bicycle. As seen in FIG. 1, the seat bottom 22 of the carrier is disposed in a generally horizontal position with the leg portions 24 and 26 being downwardly inclined.

If it is desired to use the bicycle without the carrier the carrier is simply removed by withdrawing the legs 33 from the respective sockets 44 leaving the clamp 39 attached to the bicycle. The clamp 39 in no way interferes with the operation of the bicycle by the rider.

Since the carrier 20 is attached to the headpost 35 which is rigid with the frame of the bicycle the carrier is not turned when the handlebars are turned to steer the bicycle. With the child strapped in by the belt 29 the child is protected against injury result from contact with any moving part of the bicycle or from stones or other objects which may be thrown upwardly by the moving wheels.

Various changes coming within the spirit of our invention may suggest themselves to those skilled in the art, hence, we do not wish to be limited to the specific embodiments shown and described or uses mentioned, but intend the same to merely exemplary, the scope of our invention being limited only by the appended claims.

We claim:

1. A carrier for carrying a child on the forward portion of a bicycle having a headpost rigid with the frame of the bicycle and comprising
    a. a one-piece, tubular, auxiliary frame member including a single U-shaped generally horizontal portion and a pair of spaced downwardly turned leg portions,
    b. a support member comprising a pair of co-operating clamp members adapted to be clamped to said headpost with one of said co-operating members having a pair of spaced sockets each adapted to receive a respective downwardly turned leg portion of said auxiliary frame member, and
    c. a one-piece body supporting member including a generally U-shaped integral back support and forwardly directed extensions to partially enclose the legs and feet of a seated child, said body supporting member being carried on said auxiliary frame member and including means for securing said body supporting member to said frame member.

2. The invention as defined in claim 1 in which the body supporting member has a plurality of depending bosses seated on said auxiliary frame.

3. The invention as defined in claim 1 in which each of the pair of spaced sockets adapted to receive a respective vertical leg portion of said auxiliary frame member are positioned at one of each of the terminal portions of said co-operating member, said co-operating member having an intermediate arcuate portion, and said other co-operating member having a generally V-shaped intermediate portion.

* * * * *